(12) United States Patent
Babcock

(10) Patent No.: US 9,585,541 B1
(45) Date of Patent: Mar. 7, 2017

(54) STABILIZER FOR GLASSWARE FOR USE IN AUTOMATIC DISHWASHER

(71) Applicant: Michael John Babcock, Toronto (CA)

(72) Inventor: Michael John Babcock, Toronto (CA)

( * ) Notice: Subject to any disclaimer, the term of this patent is extended or adjusted under 35 U.S.C. 154(b) by 0 days.

(21) Appl. No.: 15/276,880

(22) Filed: Sep. 27, 2016

Related U.S. Application Data

(60) Provisional application No. 62/236,738, filed on Oct. 2, 2015.

(51) Int. Cl.
```
A47L 15/50      (2006.01)
H01F 7/02       (2006.01)
F16M 13/02      (2006.01)
F16B 1/00       (2006.01)
```

(52) U.S. Cl.
CPC ............. *A47L 15/505* (2013.01); *F16B 1/00* (2013.01); *F16M 13/022* (2013.01); *H01F 7/0252* (2013.01); *F16B 2001/0035* (2013.01)

(58) Field of Classification Search
CPC .. A47L 15/505; F16B 1/00; F16B 2001/0035; H01F 7/0252; F16M 13/022
USPC ....................................... 211/41.9; 248/345.1
See application file for complete search history.

(56) References Cited

U.S. PATENT DOCUMENTS

| | | | | |
|---|---|---|---|---|
| 2,028,566 A | * | 1/1936 | Seipel ................ | A47G 23/0216 220/737 |
| 3,157,335 A | * | 11/1964 | Maier .................... | B65D 1/265 220/606 |
| 4,681,225 A | * | 7/1987 | Schuster ................... | A45C 3/00 206/426 |
| 5,201,826 A | * | 4/1993 | Zimmermann ....... | A47L 15/505 211/41.9 |
| 5,425,497 A | * | 6/1995 | Sorensen ........... | A47G 23/0216 220/738 |
| 2005/0006547 A1 | * | 1/2005 | Exler ................. | A47G 23/0225 248/311.2 |
| 2008/0128429 A1 | * | 6/2008 | Towery .............. | A47G 19/2227 220/574 |
| 2011/0062160 A1 | * | 3/2011 | Vasic ................. | A47G 19/2205 220/483 |

* cited by examiner

*Primary Examiner* — Korie H Chan

(57) ABSTRACT

A stabilizer for glassware in an automatic dishwasher has an inside to contact the item of glassware and an outside opposite the inside. A resilient mesh is selectably mountable on an item of glassware to at least partially encircle an outer circumference of the item of glassware to removably retain the item of glassware in the automatic dishwasher. The mesh includes a longitudinal axis defined by the mesh, and channels open on the inside to channel water from between the stabilizer and the item of glassware under an influence of gravity to prevent an accumulation of water in the stabilizer or between the stabilizer and the item of glassware. At least one permanent magnet is affixed to the resilient mesh to selectively magnetically attach the stabilizer and the item of glassware to an adjacent magnetically responsive object disposed in the dishwasher to thereby stabilize the item of glassware in the dishwasher and to cushion the item of glassware from impact.

18 Claims, 9 Drawing Sheets

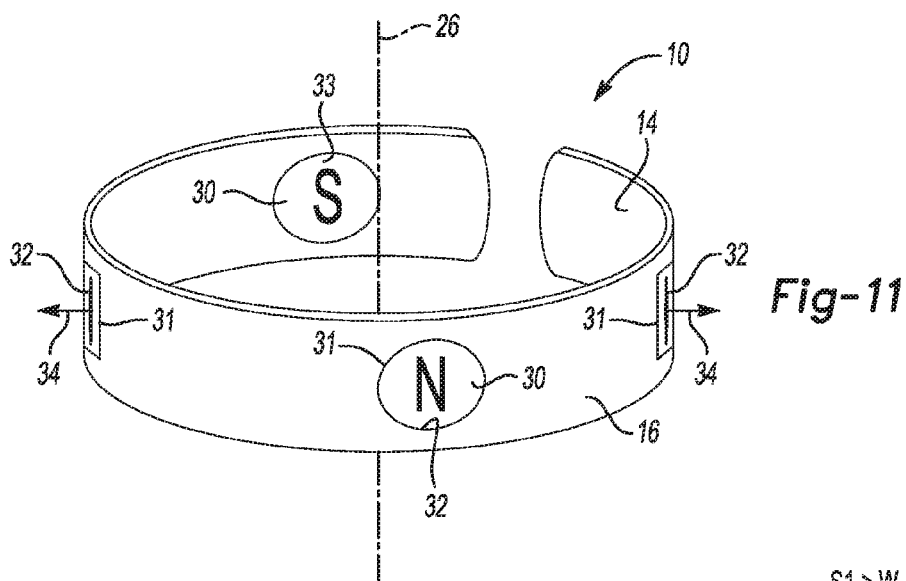
Fig-11
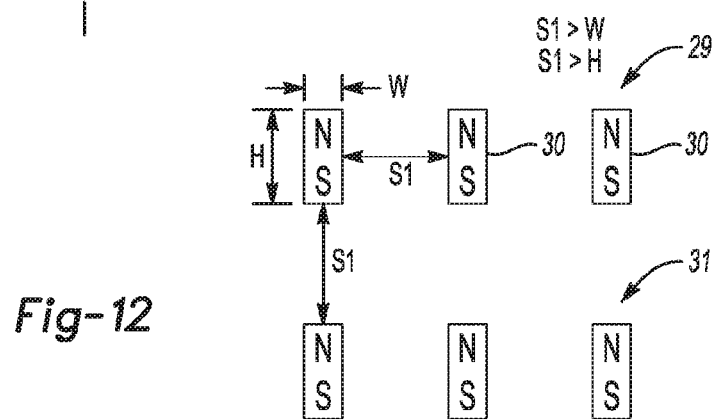
Fig-12
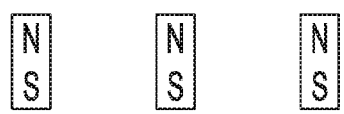
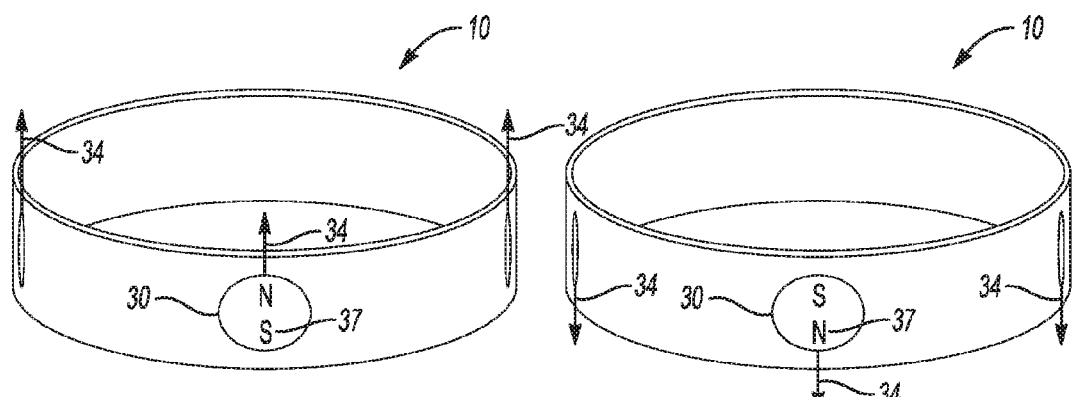
Fig-13

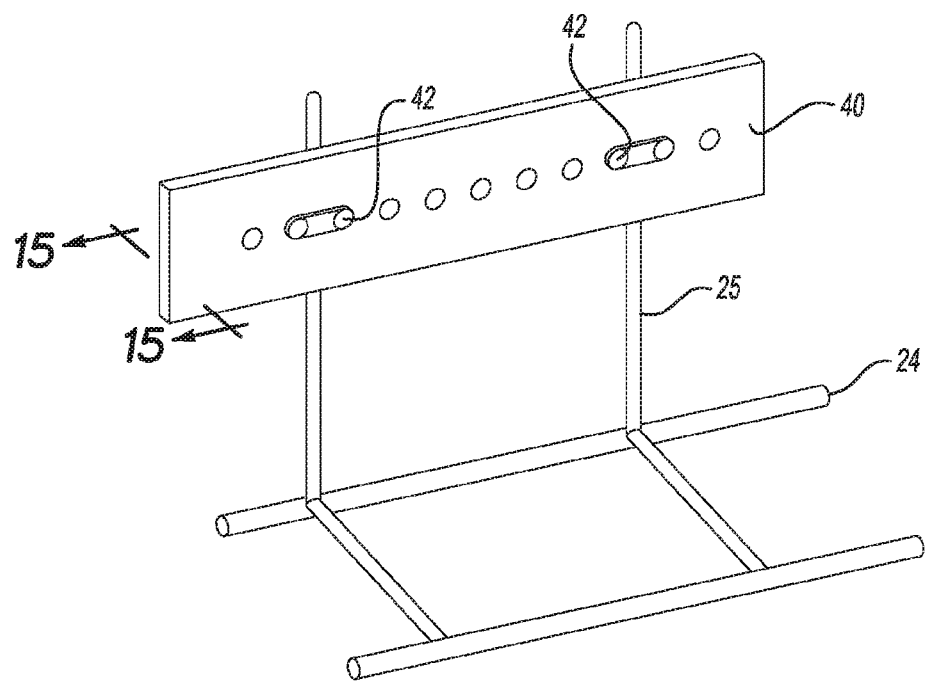
Fig-14
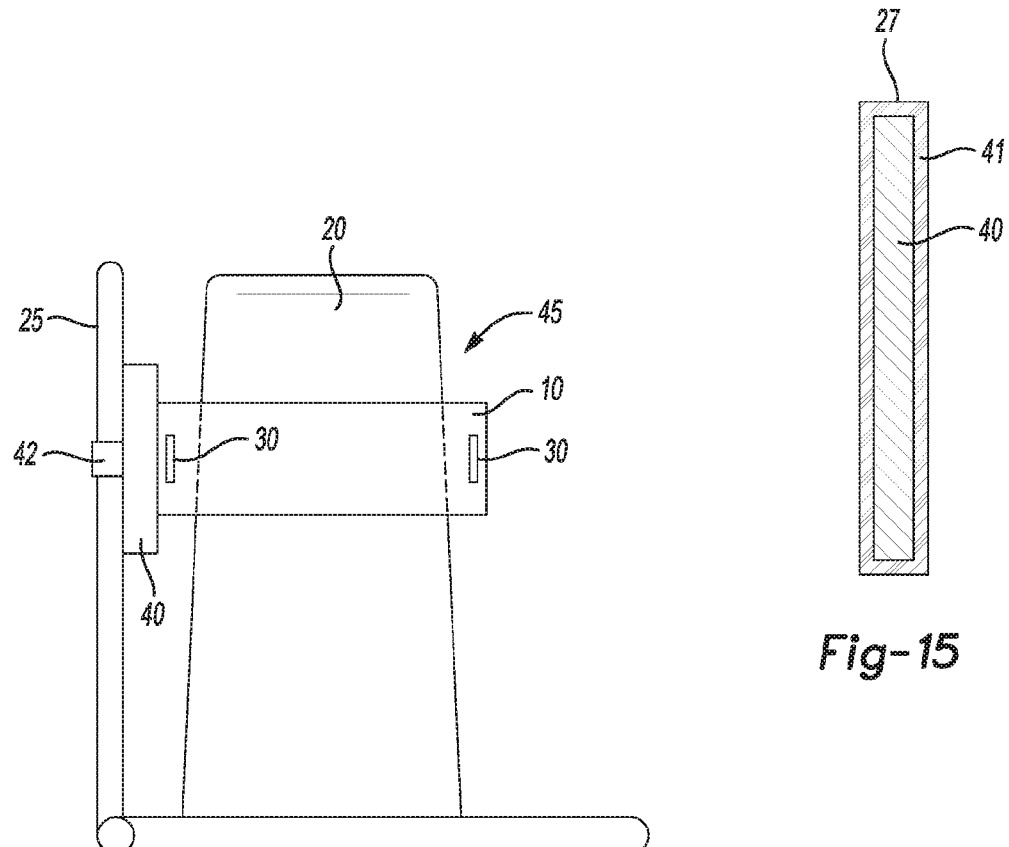
Fig-15
Fig-16

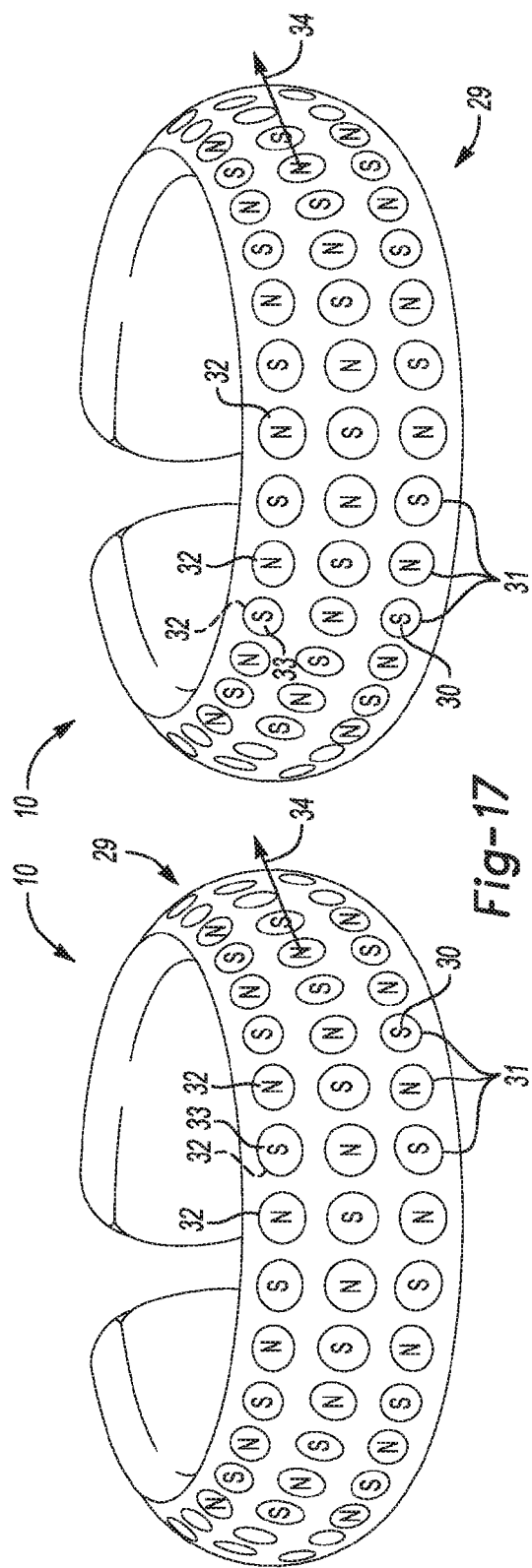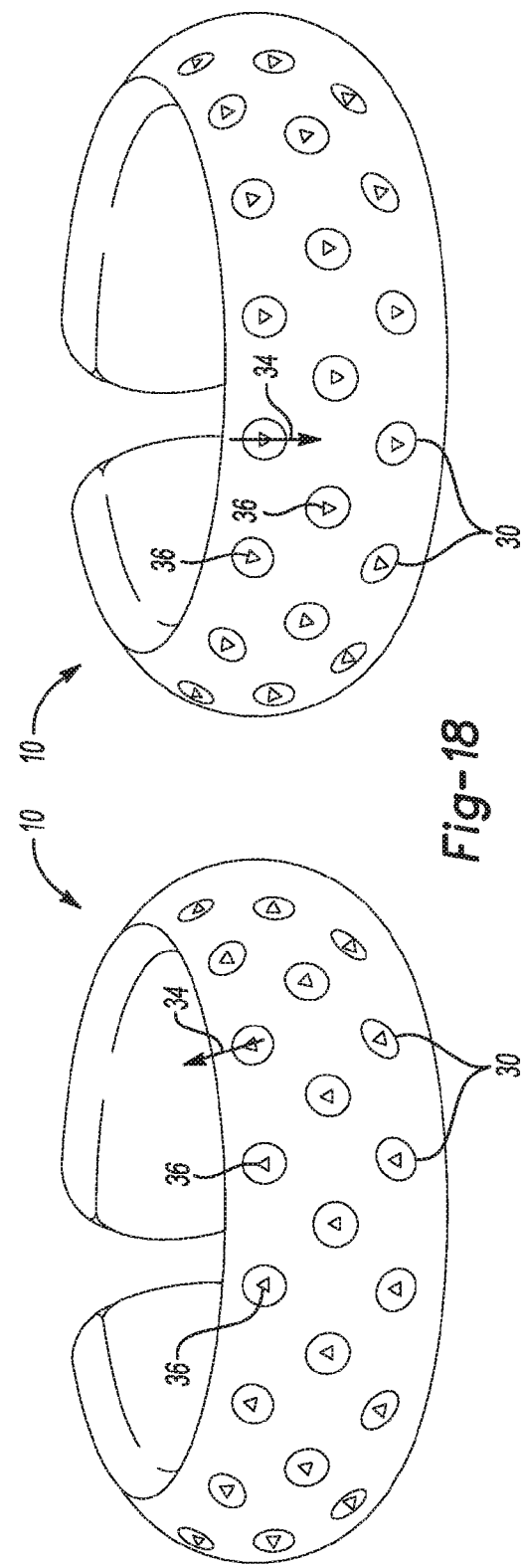

STABILIZER FOR GLASSWARE FOR USE IN AUTOMATIC DISHWASHER

BACKGROUND

Some fine glassware, for example lead crystal beverage containers and relatively high value glassware are advertised as dishwasher safe when a "china" setting is selected on the dishwasher controls. The china setting may reduce the maximum temperature and decrease water jet pressure. In some instances, even though the china setting has been selected, fine glassware may become chipped or broken during operation of the automatic dishwasher. The damage to the fine glassware may occur because the jets of water in the dishwasher cause the glassware to move, flip, and impact adjacent items of glassware. Relative motion between adjacent items of glassware may also cause worn spots, or etching at the area of contact. This will have an appearance of a cloudy ring or spot on the item of glassware.

SUMMARY

A stabilizer for glassware in an automatic dishwasher has an inside to contact the item of glassware and an outside opposite the inside. A resilient mesh is selectably mountable on an item of glassware to at least partially encircle an outer circumference of the item of glassware to removably retain the item of glassware in the automatic dishwasher. The mesh includes a longitudinal axis defined by the mesh, and channels open on the inside to channel water from between the stabilizer and the item of glassware under an influence of gravity to prevent an accumulation of water in the stabilizer or between the stabilizer and the item of glassware. At least one permanent magnet is affixed to the resilient mesh to selectively magnetically attach the stabilizer and the item of glassware to an adjacent magnetically responsive object disposed in the dishwasher to thereby stabilize the item of glassware in the dishwasher and to cushion the item of glassware from impact.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 11 is a semi-schematic perspective view depicting an example of a stabilizer with disk magnets with magnetic axis in a radial orientation with respect to the longitudinal axis of the example of the stabilizer according to the present disclosure;

FIG. 12 is a semi-schematic diagram depicting an array of permanent magnets each having substantially the same shape and size and each of permanent magnets being smaller than a space between adjacent permanent magnets in the array;

FIG. 13 is a semi-schematic diagram depicting two examples of stabilizers according to the present disclosure arranged to have magnetically opposite polarity to have magnetic attraction between the two examples of the stabilizers;

FIG. 14 is a semi-schematic perspective view depicting an example of a magnetically responsive plate according to the present disclosure attached to a rack of the dishwasher;

FIG. 15 is a semi-schematic cross-sectional view depicting an example of a magnetically responsive plate coated with a layer of silicone elastomer according to the present disclosure;

FIG. 16 is a semi-schematic cross-sectional view depicting an example of a stabilizer attached to a piece of glassware to magnetically secure the piece of glassware to a magnetically responsive plate attached to a rack of a dishwasher;

FIG. 17 is a semi-schematic perspective view of a pair of stabilizers each having a respective north pole facing opposite to the respective north pole of each adjacent permanent magnet in the array;

FIG. 18 is a semi-schematic perspective view of a pair of stabilizers each having an array of permanent magnets, each permanent magnet is arranged to have the respective magnetic axis substantially parallel to the longitudinal axis with each respective north pole facing a same predetermined direction;

DETAILED DESCRIPTION

Figure 1:
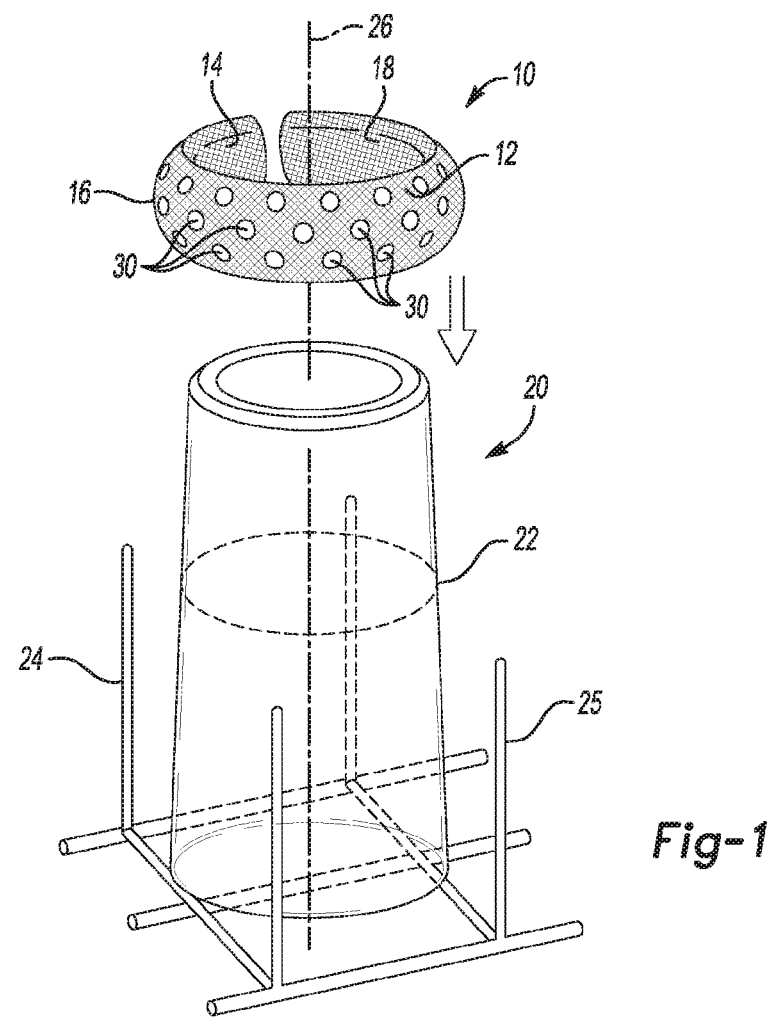
FIG. 1 is a perspective, partially exploded view of an example of a stabilizer for glassware in an automatic dishwasher according to the present disclosure.

A magnetically enhanced protective collar or stabilizer for wrapping around fine glassware to reduce breakage in an automatic dishwasher is disclosed herein. The stabilizer may reduce breakage of fine glassware/crystal in a dishwasher by holding the glassware in place, thereby preventing movement and impact with adjacent glassware or other objects in the dishwasher. The stabilizer may also cushion the glassware from impacts with adjacent glassware. The stabilizer is easy to install on the glassware before the glassware is loaded in the dishwasher, or after the glassware is loaded in the dishwasher.

An example of a stabilizer as disclosed herein may include a flexible, expandable web/mesh/net collar or cuff to allow water to easily flow through and drain from the collar/cuff, and promote heat migration and sanitation. In an example, the stabilizer may have a donut or hollow toroidal shape to act as a cushion. In other examples, the stabilizer may be a band. The band may be flat parallel to the longitudinal axis, or the band may have a curvature in the direction of the longitudinal axis. From the top view, looking along the longitudinal axis, the stabilizer may be a closed curve, or an open curve. An open curve, for example a C-shaped curve, may be resiliently adjustable to fit different sizes of glassware by stretching the C-shaped curve open and allowing the curve to resiliently engage the glassware when the stabilizer is released. An example having a closed curve may be stretched to over glassware having a range of diameters. The stabilizer may include silicone similar to material used in silicone bakeware. The silicone is soft, flexible, and can withstand heat of the dishwasher. The stabilizer provides cushioned support for the glassware in the automatic dishwasher.

As disclosed herein, the stabilizer includes a plurality of magnets attached to the mesh collar/cuff. The magnets may be relatively small beads, ⅛ inch to about ¼ inch in diameter. In other examples, the magnets may be larger and may be disk or bar magnets. In an example, the resilient mesh is a magnetizable metal. In other examples, the resilient mesh is magnetically responsive, but it does not remain magnetized at an effective level for an effective length of time. A plurality of magnets may be attached to the mesh cuff. In an example, the magnets may be regularly spaced about the circumference of the stabilizer. In examples, the magnets may be neodymium or ferrite "button" magnets. In other examples, there may be a large number of smaller magnets arranged in an array. The magnets are selected to retain sufficient magnetic field strength at the upper temperature range in the dishwasher.

A cushion layer may be established over the resilient mesh and the magnets. The cushion layer may be silicone or any other high temperature polymer. The mesh provides good drainage and allows the dishwasher jets to wash the glassware without creating pooling points for the dishwasher water that becomes laden with food particles during a dishwashing cycle.

A magnetically responsive plate, or backwall may be used with the stabilizers. The magnets attach to the magnetically responsive plate and hold the glassware in place. The magnetically responsive plate may be fastened using "snap" fasteners or any suitable fastening devices including silicone thongs, corrosion resistant twist ties, or hook and loop fasteners. A ferrite strip may be included on the magnetically responsive plate to make the plate magnetically attractive to the stabilizers.

As used herein, a magnetic axis means the straight line joining the two poles of a magnet. A magnetic pole means a point at either end of a magnetic field where the magnetic force is concentrated and strongest. The poles of a magnet may be visualized by using a simple permanent bar magnet. A permanent magnet is called a "permanent" magnet because the permanent magnet's magnetic properties are constant. The two ends of a permanent magnet are the poles of the permanent magnet.

As used herein, a north pole of a magnet is the pole that would be attracted to the magnetic pole in the northern hemisphere of the Earth during a period of normal magnetic polarity of the Earth as exhibited during the Brunhes chron excluding geomagnetic excursions. A magnetic pole is attracted to the opposite magnetic pole. Therefore, the Earth's magnetic pole in the northern hemisphere of the Earth in the Brunhes chron is a south magnetic pole. It should be noted that, based on geological evidence, it is theorized that the magnetic poles of the Earth have, over the eons of Earth's existence, flipped from north to south. A geomagnetic reversal is a change in a planet's magnetic field such that the positions of magnetic north and magnetic south are interchanged. The Earth's magnetic field has alternated between periods of normal polarity, in which the direction of the field was the same as the direction at the time of the present disclosure, and reverse polarity, in which the field was the opposite. These periods are called chrons. Most reversals are estimated to take between 1,000 and 10,000 years. At the time of the present disclosure, the Earth is in the Brunhes chron, and which began about 780,000 years ago. According to some theories, 4 or more relatively brief reversals of polarity, known as excursions (e.g., the Laschamp excursion), have occurred during the Brunhes chron. As such, the present disclosure defines a north magnetic pole in terms of the normal polarity of the Earth as exhibited during the Brunhes chron, and not during excursions or any other variation in the polarity of the Earth's magnetic field.

FIG. 1 is a perspective, partially exploded view of a stabilizer 10 for glassware 20 in an automatic dishwasher 24 according to the present disclosure. The stabilizer 10 has an inside 14 to contact the item of glassware 20 and an outside 16 opposite the inside 14. A resilient mesh 12 is selectably mountable on the item of glassware 20 to at least partially encircle an outer circumference 22 of the item of glassware 20 to removably retain the item of glassware 20 in the automatic dishwasher 24. The mesh 12 includes a longitudinal axis 26 defined by the mesh 12. Channels 18 open on the inside 14 to channel water from between the stabilizer 10 and the item of glassware 20 under an influence of gravity to prevent an accumulation of water in the stabilizer 10 or between the stabilizer 10 and the item of glassware 20.

At least one permanent magnet 30 is affixed to the resilient mesh 12 to selectively magnetically attach the stabilizer 10 and the item of glassware 20 to an adjacent magnetically responsive object disposed in the dishwasher 24 to thereby stabilize the item of glassware 20 in the dishwasher 24 and to cushion the item of glassware 20 from impact. In an example, the magnetically responsive object may be another instance of the item of glassware 20 with another instance of the stabilizer 10 attached to the other instance of the item of glassware 20. In another example, the magnetically responsive object may be a magnetically responsive plate 40 as depicted in FIG. 14.

Figure 2:
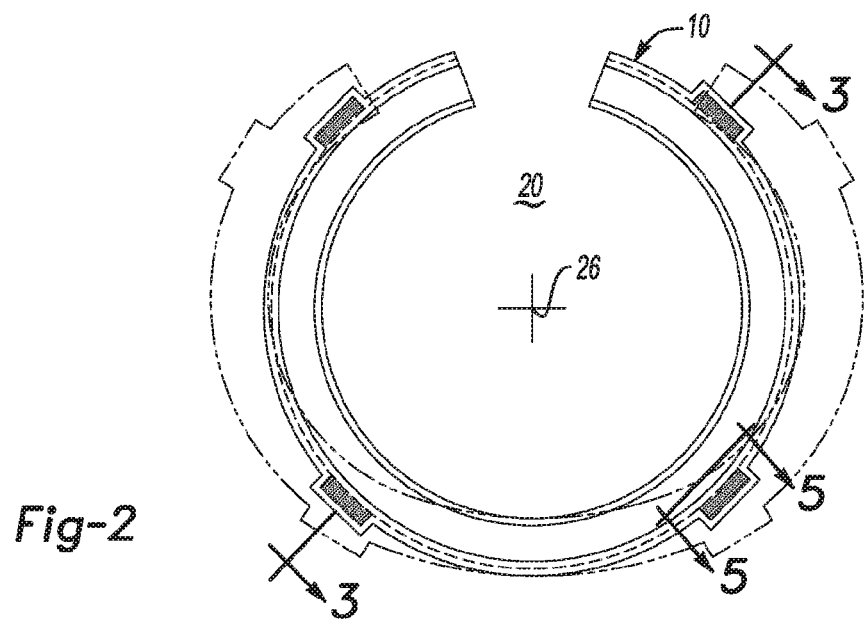
FIG. 2 is a top view of another example of a stabilizer for glassware according to the present disclosure.
Figure 3:
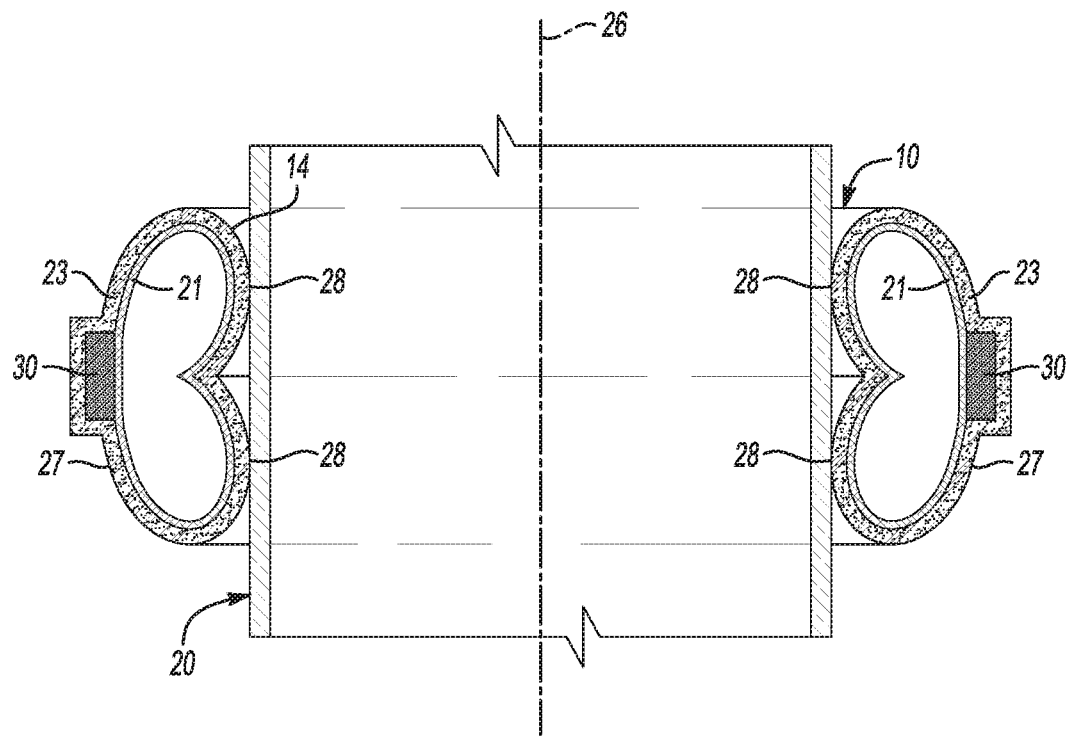
FIG. 3 is a cross-sectional view of the example of the stabilizer for glassware shown in FIG. 2 with the cross-section taken along line 3-3 as indicated in FIG. 2.
Figure 4:
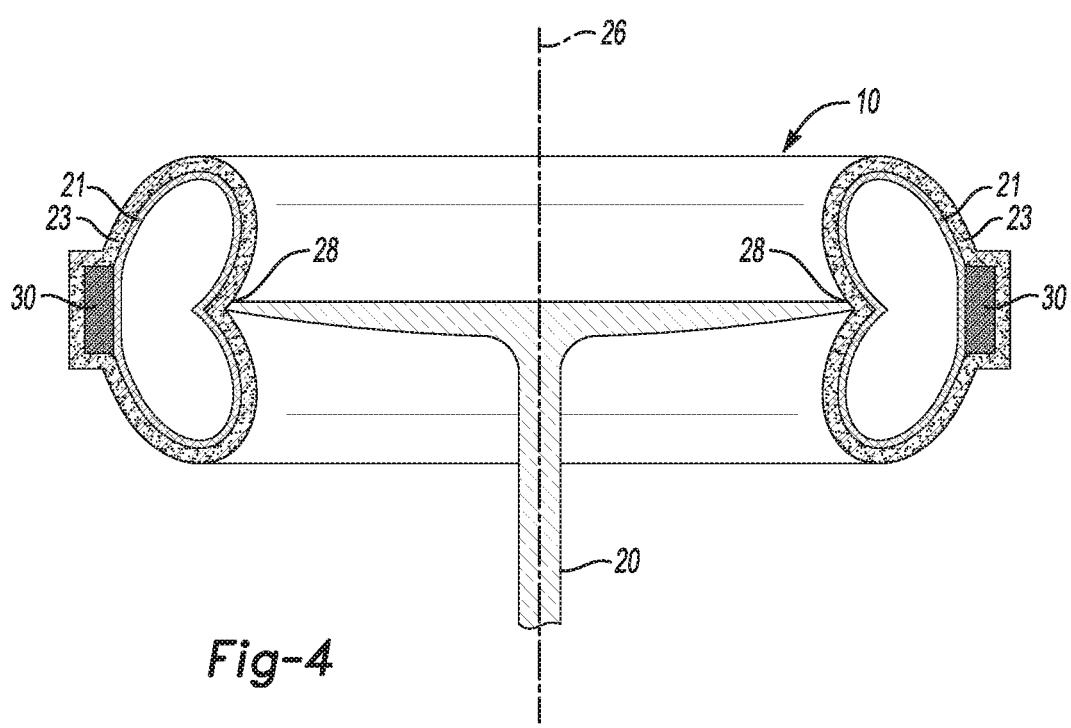
FIG. 4 is a cross-sectional view of the example of the stabilizer for glassware similar to FIG. 3 except the item of glassware depicted in FIG. 4 is an item of stemware.

FIG. 2 is a top view of another example of a stabilizer 10 for glassware according to the present disclosure. The resilient mesh 12 urges the inside 14 of the stabilizer 10 to contact the item of glassware 20 thereby defining a contact surface 28 of the item of glassware 20 (see FIGS. 3 and 4). In examples of the stabilizer 10 shown in FIGS. 3 and 4, the resilient mesh 12 may be formed from a metal with a cushion layer 23 disposed on the resilient mesh 12. The cushion layer 23 may be formed from an elastomer, including a silicone elastomer 27. A silicone elastomer 27 may be particularly well suited to resist deterioration from dishwasher detergents and high temperatures encountered in automatic dishwashers 24.

Figure 5:
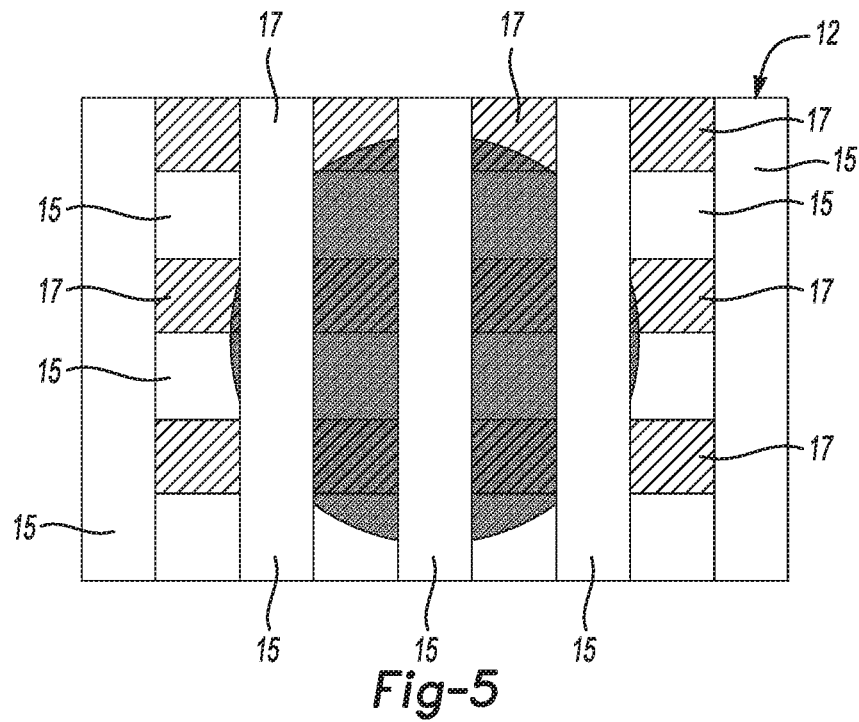
FIG. 5 is view looking through a portion of the example of the stabilizer as depicted in FIG. 2 at line 5-5, showing an example of a permanent magnet attached to the resilient mesh according to the present disclosure.
Figure 6:
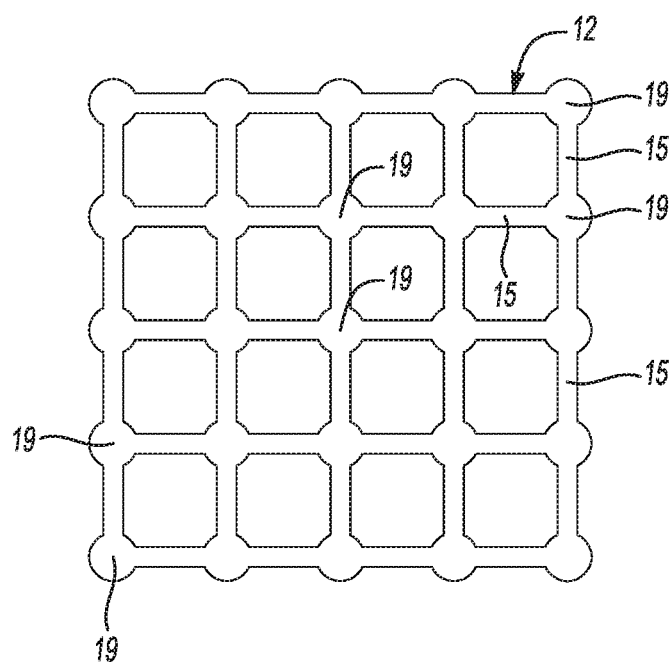
FIG. 6 is a view looking through a portion of an example of the resilient mesh with nubs molded onto the resilient mesh according to the present disclosure.

As shown in FIGS. 5 and 6, the resilient mesh 12 includes strand elements 15 to define apertures 17 for fluid communication between the inside 14 of the stabilizer 10 and the outside 16 of the stabilizer 10. FIG. 6 depicts a portion of the stabilizer 10 with nubs 19 molded onto the mesh 12 to reduce a total area of the contact surface 28 (see FIG. 3). The nubs 19 hold the strand elements 15 away from the item of glassware 20. As depicted in FIGS. 5 and 6, the resilient mesh 12 may have a radial solidity from about 0.1 to about 0.7. Solidity is the dimensionless ratio of the projected blocked area to the total projected area.

Figure 7:
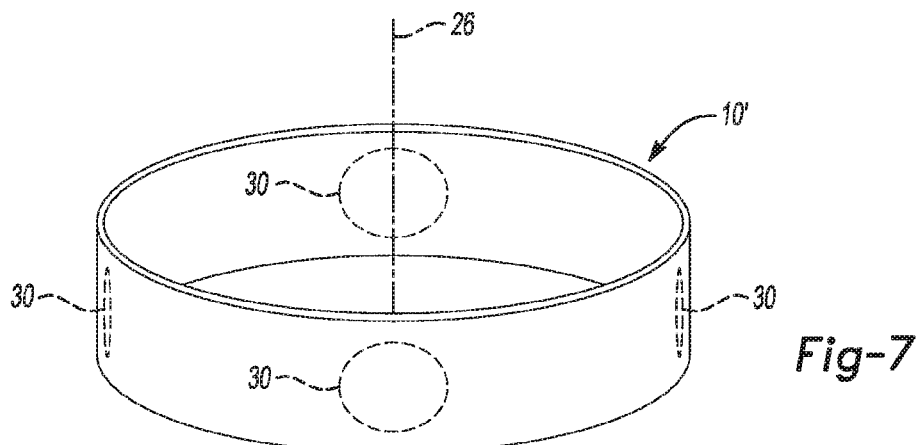
FIG. 7 is a semi-schematic perspective view of an example of a stabilizer that forms a closed curve according to the present disclosure.

FIG. 7 is a semi-schematic perspective view of an example of a stabilizer 10' that forms a closed curve according to the present disclosure. The resilient mesh 12 may be included in the stabilizer 10' depicted in FIG. 7, however, the resilient mesh 12 is not shown in FIG. 7 for drawing convenience and clarity. In examples wherein the stabilizer 10' forms a closed curve, the resilient mesh 12 may be formed from an elastomer such as silicone. Since the curve is closed, the resilience of the elastomer will be sufficient to hold the stabilizer 10' onto the item of glassware 20.

Figure 8:
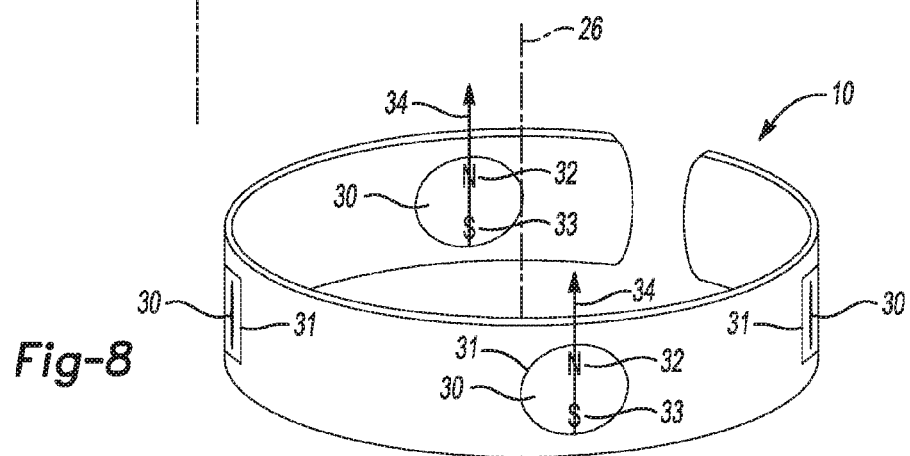
FIG. 8 is a semi-schematic perspective view of an example of a stabilizer with magnetic axes aligned parallel to the longitudinal axis according to the present disclosure.

FIG. 8 is a semi-schematic perspective view of an example of a stabilizer 10 with magnetic axes 34 aligned parallel to the longitudinal axis 26 according to the present disclosure. As with FIG. 7, the resilient mesh 12 is not shown in FIG. 8 for drawing convenience and clarity. As depicted in FIG. 8, the stabilizer 10 may have a plurality 31 of permanent magnets 30. Each permanent magnet 30 in the plurality 31 of permanent magnets 30 has a respective north pole 32, a respective south pole 33 opposite the respective north pole 32, and a respective magnetic axis 34 defined by the respective north pole 32 and the respective south pole 33. Each permanent magnet 30 is arranged to have the respective magnetic axis 34 substantially parallel to the longitudinal axis 26 with each respective north pole 32 facing a same predetermined direction.

Figure 9:
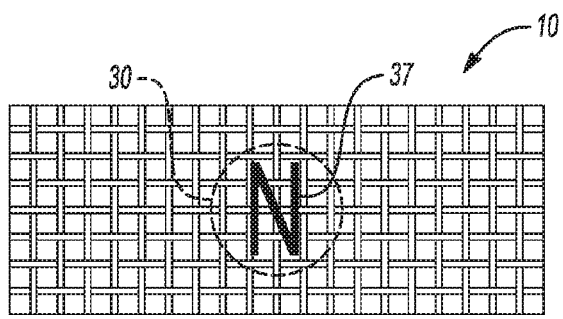
FIG. 9 is a semi-schematic perspective view of an example of a portion of a stabilizer with an indicator molded into the stabilizer to indicate a direction of the north pole of the permanent magnet.

As depicted in FIG. 9, an indicator 37 may be molded into the stabilizer 10 to indicate a direction of the poles of the plurality 31 of permanent magnets 30. In the example depicted in FIG. 9, the indicator 37 is a letter "N" molded into the silicone elastomer 27. Other examples of indicators 37 may be arrows (as seen in FIG. 18), Braille code (not shown), color, or texture. The indicator 37 may make it easier to align the magnet 30 with a magnet 30 having an opposite polar orientation. Other information and ornamentation may be molded into the stabilizer 10 including logos, user instructions, labels, etc.

Figure 10:
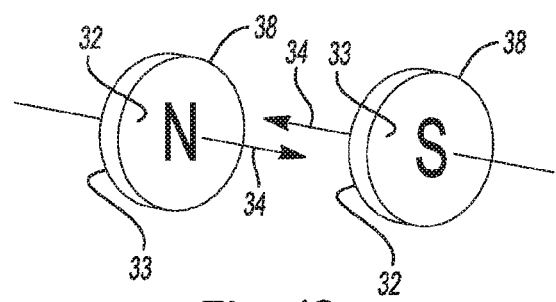
FIG. 10 is a semi-schematic perspective view depicting disk magnets with the magnetic field axially oriented through the thickness of the disks.

FIG. 10 is a semi-schematic perspective view depicting disk magnets 38 with the magnetic axis 34 axially oriented through the thickness 39 of the disk magnets 38. FIG. 11 is a semi-schematic perspective view depicting an example of a stabilizer 10 with disk magnets 38 similar to the disk magnets 38 shown in FIG. 10. The stabilizer 10 has a plurality 31 of permanent magnets 30. Each permanent magnet 30 in the plurality 31 of permanent magnets 30 has a respective north pole 32, a respective south pole 33 opposite the respective north pole 32, and a respective magnetic axis 34 defined by the respective north pole 32 and the respective south pole 33. The respective magnetic axis 34 of each permanent magnet 30 is substantially radial with respect to the longitudinal axis 26. Each permanent magnet 30 has the respective north pole 32 facing the inside 14 or each permanent magnet 30 has the respective north pole 32 facing the outside 16. The resilient mesh 12 may be formed from a metal with a cushion layer 23 disposed thereon, the cushion layer 23 is formed from a silicone elastomer 27. (See FIGS. 3 and 4.) As in FIG. 7, the resilient mesh 12 is not shown in FIG. 11 for drawing convenience and clarity. As shown in FIG. 11, all of the magnets 30 on the stabilizer 10 have their north poles 32 facing radially outward from the stabilizer 10. In such an example, the permanent magnets 30 will tend to repel the permanent magnets of a similar stabilizer 10. The stabilizer 10 may be attached to a magnetically responsive plate 40 as shown in FIG. 16, and the magnetic repulsion may cushion the glassware 20 from adjacent glassware 20 without contact between the adjacent permanent magnets 30 with the same polarity.

FIG. 12 is a semi-schematic diagram depicting an array 29 of permanent magnets 30 each having substantially the same shape and size and each of permanent magnets 30 being smaller than a space S1 between adjacent permanent magnets 30 in the array 29. The stabilizer 10 may have the plurality 31 of permanent magnets 30 arranged in an array 29 as shown in FIG. 12. Each of the plurality 31 of permanent magnets 30 is substantially the same shape and size. Each of the plurality 31 of permanent magnets 30 is smaller than a space S1 between adjacent permanent magnets 30 in the plurality 31 of permanent magnets 30. The permanent magnets 30 in the array may have magnetic orientation as shown in FIG. 12. An adjacent stabilizer 10 with a similar array will tend to self-align so that the magnets 30 in the adjacent stabilizer 10 enter the space S1 between adjacent permanent magnets thereby self-arranging the magnetic poles to opposite magnetic poles and creating attractive magnetic force between the adjacent stabilizers. If the magnets 30 are magnetized like the disk magnets 38 shown in FIG. 10, the magnets 30 will repel one another when the disk magnets 38 are face-to-face with the same polarity. However, if the disk magnets 38 are shifted such that the magnets align with the space S1, the sides of the disk magnets 38 may produce an attracting force.

FIG. 13 is a semi-schematic diagram depicting two examples of stabilizers 10 according to the present disclosure arranged to have magnetically opposite polarity to have magnetic attraction between the two examples of the stabilizers 10. As shown in FIG. 13, if the magnets 30 have a magnetic axis 34 parallel to the longitudinal axis 26, adjacent stabilizers 10 may be made conveniently attractive to one another by inverting one of the adjacent stabilizers 10 before placing on the item of glassware 20. The indicator 37 helps the user determine the orientation of the magnetic fields so that one of the stabilizers 10 may be inverted without having to test for magnetic attraction.

FIG. 14 is a semi-schematic perspective view depicting an example of a magnetically responsive plate 40 according to the present disclosure attached to a rack 25 of the dishwasher 24. FIG. 15 is a semi-schematic cross-sectional view depicting an example of a magnetically responsive plate 40 coated with a layer 41 of silicone elastomer 27 according to the present disclosure. FIG. 16 is a semi-schematic cross-sectional view depicting an example of a stabilizer 10 attached to an item of glassware 20 to magnetically secure the item of glassware 20 to the magnetically responsive plate 40 attached to the rack 25 of the dishwasher 24. As disclosed herein, an apparatus 45 for stabilizing glassware 20 in a dishwasher 24 may include the stabilizer 10, the magnetically responsive plate 40 having fasteners 42 attached thereto for removably attaching the plate 40 to the rack 25 of the dishwasher 24. The stabilizer 10 may be magnetically attachable to the plate 40 when the stabilizer 10 is mounted on the item of glassware 20. In an example, the magnetically responsive plate 40 may be magnetically responsive stainless steel. In other examples, the magnetically responsive plate 40 may be any magnetically responsive metal, for example steel. Iron, nickel and cobalt are other magnetically responsive metals. The magnetically responsive metal may be coated with silicone elastomer 27 to prevent corrosion of the magnetically responsive metal in the dishwasher in the presence of dishwashing chemicals. The magnetically responsive metal may also be painted or plated with corrosion resistant materials. In an example, a powder coating process may be used to apply the corrosion resistant layer over the magnetically responsive metal.

Figure 23:
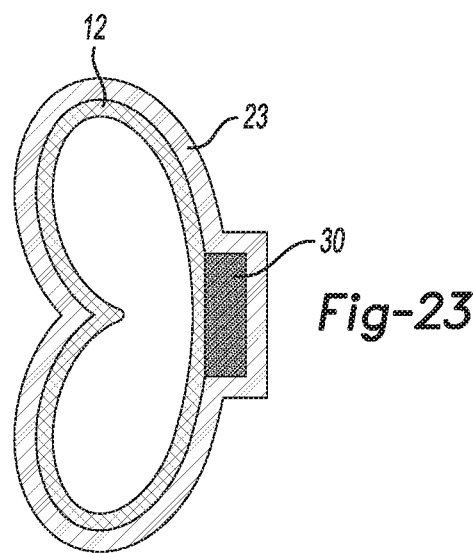
FIG. 23 is a semi-schematic cross-sectional view taken through a magnet as indicated in FIG. 22.

FIG. 17 is a semi-schematic perspective view of a pair of stabilizers 10 each having a respective north pole 32 facing opposite to the respective north pole 32 of each adjacent permanent magnet 30 in the array 29. The stabilizer 10 has a plurality 31 of permanent magnets 30. Each permanent magnet 30 in the plurality 31 of permanent magnets 30 has a respective north pole 32, a respective south pole 33 opposite the respective north pole 32, and a respective magnetic axis 34 defined by the respective north pole 32 and the respective south pole 33. The respective magnetic axis 34 of each permanent magnet 30 is substantially radial with respect to the longitudinal axis 26. The plurality 31 of permanent magnets 30 is arranged in an array 29. Each permanent magnet 30 has the respective north pole 32 facing opposite to the respective north pole 32 of each adjacent permanent magnet 30 in the array 29. The resilient mesh 12 is formed from a metal with a cushion layer 23 disposed thereon. The cushion layer 23 may be formed from silicone elastomer 27 as depicted in FIG. 23.

FIG. 18 is a semi-schematic perspective view of a pair of stabilizers 10 each having an array 29 of permanent magnets 30. Each permanent magnet 30 is arranged to have the respective magnetic axis 34 substantially parallel to the longitudinal axis 26 with each respective north pole 32 facing a same predetermined direction. The triangles 36 shown in FIG. 18 are the indicators 37 that depict a direction of the magnetic axis 34. One of the stabilizers 10 depicted in FIG. 18 is shown inverted with respect to the other stabilizer 10 so that the magnetic axes 34 are opposite in polarity to the magnetic axes 34 of the other stabilizer 10, thereby making the pair of stabilizers magnetically attractive to one another.

Figure 19:
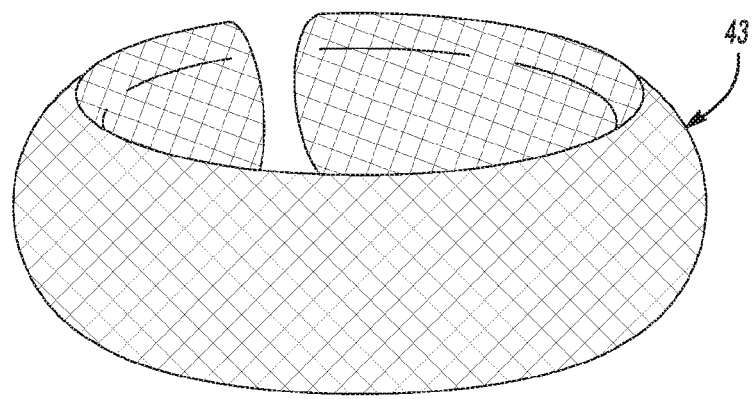
FIG. 19 is a semi-schematic perspective view of a resilient mesh cuff according to the present disclosure.

FIG. 19 is a semi-schematic perspective view of a resilient mesh cuff 43 according to the present disclosure. The resilient mesh cuff 43 does not have magnets 30 attached, or a cushion layer 23 applied. The resilient mesh cuff 43 may be made from any magnetically responsive material, including steel and nickel. Some stainless steels are magnetically responsive. The resilient mesh cuff 43 serves as a substrate for mounting the permanent magnets 30 and the cushion layer 23.

Figure 20:
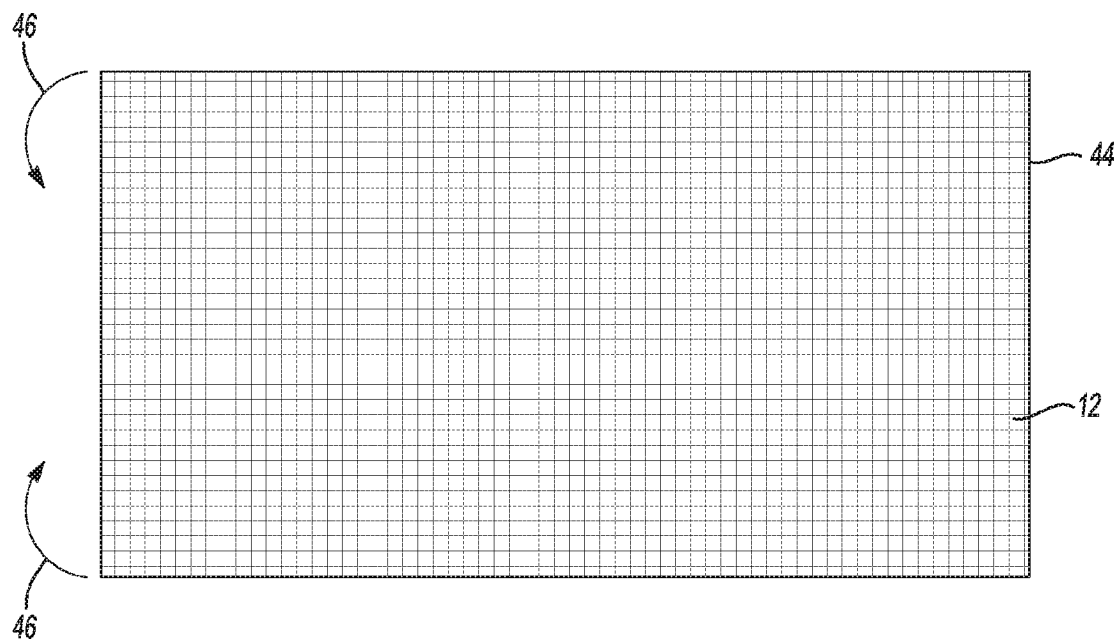
FIG. 20 is a semi-schematic perspective view of a sheet of resilient mesh prior to being formed into the resilient mesh cuff depicted in FIG. 19.
Figure 21:
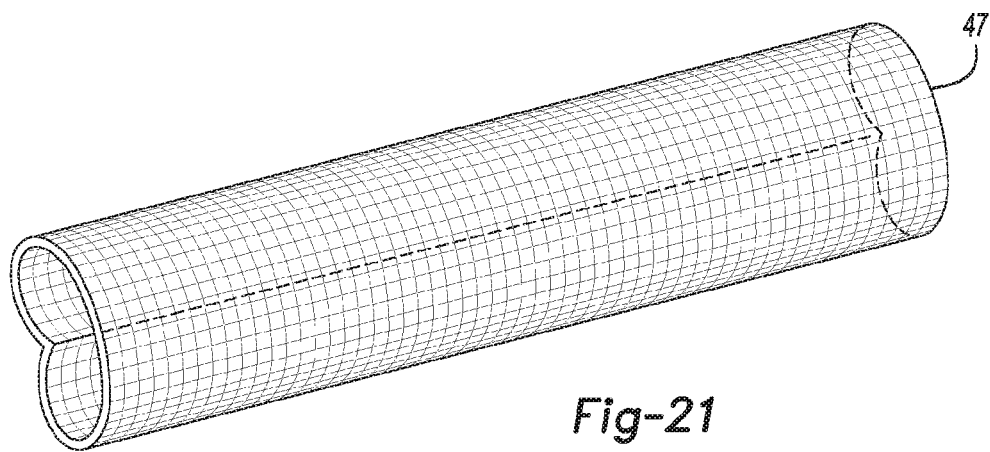
FIG. 21 is a semi-schematic perspective view of a tube formed from the sheet of resilient mesh depicted in FIG. 20, prior to being formed into the cuff depicted in FIG. 19.

FIG. 20 is a semi-schematic perspective view of a sheet 44 of resilient mesh prior to being formed into the resilient mesh cuff 43 depicted in FIG. 19. The curved arrows 46 indicate the process of rolling the resilient mesh 12 into a tube 47. The tube 47 may have any suitable cross-sectional shape. For example, the tube 47 may have a round cross-section, or may have a kidney-shaped cross section as shown in FIG. 21. The tubular shape helps provide cushioning for the item of glassware 20 in the dishwasher 24. FIG. 21 is a semi-schematic perspective view of a tube 47 formed from the sheet 44 of resilient mesh 12 depicted in FIG. 20, prior to being formed into the cuff 43 depicted in FIG. 19.

Figure 22:
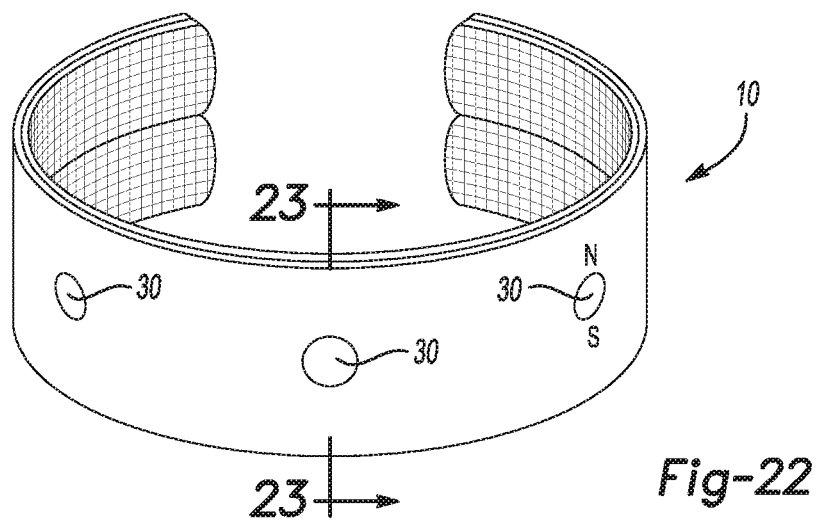
FIG. 22 is a semi-schematic perspective view of an example of a stabilizer having permanent magnets attached.

FIG. 22 is a semi-schematic perspective view of an example of a stabilizer 10 having permanent magnets 30 attached. The resilient mesh 12 is not shown on the outside of the stabilizer 10 as a drawing convenience and for clarity. FIG. 23 is a semi-schematic cross-sectional view taken through a magnet as indicated in FIG. 22. In examples of the stabilizer 10 shown in FIG. 23, the resilient mesh 12 may be formed from a metal with a cushion layer 23 disposed on the resilient mesh 12. The cushion layer 23 may be formed from an elastomer, including a silicone elastomer 27.

Also disclosed herein is a kit for stabilizing glassware 20 in a dishwasher 24. The kit may include a plurality of any of examples of the stabilizers 10 disclosed herein. The kit may further include a magnetically responsive plate 40 having fasteners 42 attached thereto for removably attaching the plate 40 to a rack 25 of the dishwasher 24. Each of the plurality of stabilizers 10 may be magnetically attachable to the plate 40 when each of the plurality of stabilizers 10 is mounted on a respective, separate item of glassware 20.

It is to be understood that the ranges provided herein include the stated range and any value or sub-range within the stated range. For example, a range of a dimensionless ratio from about 0.1 to about 0.7 should be interpreted to include not only the explicitly recited limits of about 0.1 and about 0.7, but also to include individual values, such as 0.2, 0.35, etc., and sub-ranges, such as from about 0.2 to about 0.58, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A stabilizer for glassware in an automatic dishwasher, the stabilizer comprising:
an inside to contact the item of glassware;
an outside opposite the inside;
a resilient mesh selectably mountable on an item of glassware to at least partially encircle an outer circumference of the item of glassware to removably retain the item of glassware in the automatic dishwasher, the mesh including:
a longitudinal axis defined by the mesh; and
channels open on the inside to channel water from between the stabilizer and the item of glassware under an influence of gravity to prevent an accumulation of water in the stabilizer or between the stabilizer and the item of glassware; and
at least one permanent magnet affixed to the resilient mesh to selectively magnetically attach the stabilizer and the item of glassware to an adjacent magnetically responsive object disposed in the dishwasher to thereby stabilize the item of glassware in the dishwasher and to cushion the item of glassware from impact.

2. The stabilizer as defined in claim 1 wherein the resilient mesh is formed from a metal with a cushion layer disposed on the resilient mesh, the cushion layer formed from a silicone elastomer.

3. The stabilizer as defined in claim 2 wherein:
the resilient mesh urges the inside of the stabilizer to contact the item of glassware thereby defining a contact surface of the item of glassware; and
the resilient mesh includes strand elements to define apertures for fluid communication between the inside of the stabilizer and the outside of the stabilizer.

4. The stabilizer as defined in claim 3 wherein nubs are molded onto the mesh to reduce a total area of the contact surface and wherein the nubs hold the strand elements away from the item of glassware.

5. The stabilizer as defined in claim 1 wherein the resilient mesh has a radial solidity from about 0.1 to about 0.7.

6. The stabilizer as defined in claim 1 wherein:
the at least one permanent magnet is a plurality of permanent magnets;
each permanent magnet in the plurality of permanent magnets has a respective north pole, a respective south pole opposite the respective north pole, and a respective magnetic axis defined by the respective north pole and the respective south pole; and
each permanent magnet is arranged to have the respective magnetic axis substantially parallel to the longitudinal axis with each respective north pole facing a same predetermined direction.

7. The stabilizer as defined in claim 6 wherein the resilient mesh is formed from a metal with a cushion layer disposed on the resilient mesh, the cushion layer molded from a silicone elastomer, and wherein an indicator is molded into the stabilizer to indicate a direction of the poles of the plurality of permanent magnets.

8. The stabilizer as defined in claim 1 wherein:
the at least one permanent magnet is a plurality of permanent magnets;
each permanent magnet in the plurality of permanent magnets has a respective north pole, a respective south pole opposite the respective north pole, and a respective magnetic axis defined by the respective north pole and the respective south pole;
the respective magnetic axis of each permanent magnet is substantially radial with respect to the longitudinal axis;
each permanent magnet has the respective north pole facing the inside or each permanent magnet has the respective north pole facing the outside; and
the resilient mesh is formed from a metal with a cushion layer disposed thereon, the cushion layer formed from silicone.

9. The stabilizer as defined in claim 8 wherein the plurality of permanent magnets is arranged in an array wherein each of the plurality of permanent magnets is substantially the same shape and size and wherein each of the plurality of permanent magnets is smaller than a space between adjacent permanent magnets in the plurality of permanent magnets.

10. The stabilizer as defined in claim 1 wherein:
the at least one permanent magnet is a plurality of permanent magnets;
each permanent magnet in the plurality of permanent magnets has a respective north pole, a respective south pole opposite the respective north pole, and a respective magnetic axis defined by the respective north pole and the respective south pole;
the respective magnetic axis of each permanent magnet is substantially radial with respect to the longitudinal axis;
the plurality of permanent magnets is arranged in an array;
each permanent magnet has the respective north pole facing opposite to the respective north pole of each adjacent permanent magnet in the array; and
the resilient mesh is formed from a metal with a cushion layer disposed thereon, the cushion layer formed from silicone.

11. An apparatus for stabilizing glassware in a dishwasher, comprising:
the stabilizer as defined in claim 1; and
a magnetically responsive plate having fasteners attached thereto for removably attaching the plate to a rack of the dishwasher wherein the stabilizer is magnetically attachable to the plate when the stabilizer is mounted on the item of glassware.

12. The apparatus as defined in claim 11 wherein the magnetically responsive plate is magnetically responsive stainless steel.

13. The apparatus as defined in claim 11 wherein the magnetically responsive plate is coated with a layer of silicone elastomer.

14. A kit for stabilizing glassware in a dishwasher, comprising a plurality of the stabilizers as defined in claim 7.

15. A kit for stabilizing glassware in a dishwasher, comprising a plurality of the stabilizers as defined in claim 8.

16. A kit for stabilizing glassware in a dishwasher, comprising a plurality of the stabilizers as defined in claim 9.

17. A kit for stabilizing glassware in a dishwasher, comprising a plurality of the stabilizers as defined in claim 10.

18. A kit for stabilizing glassware in a dishwasher, comprising:
a plurality of the stabilizers as defined in claim 1; and
a magnetically responsive plate having fasteners attached thereto for removably attaching the plate to a rack of the dishwasher wherein the each of the plurality of stabilizers is magnetically attachable to the plate when each of the plurality of stabilizers is mounted on a respective, separate item of glassware.

* * * * *